United States Patent Office 2,869,600
Patented Jan. 20, 1959

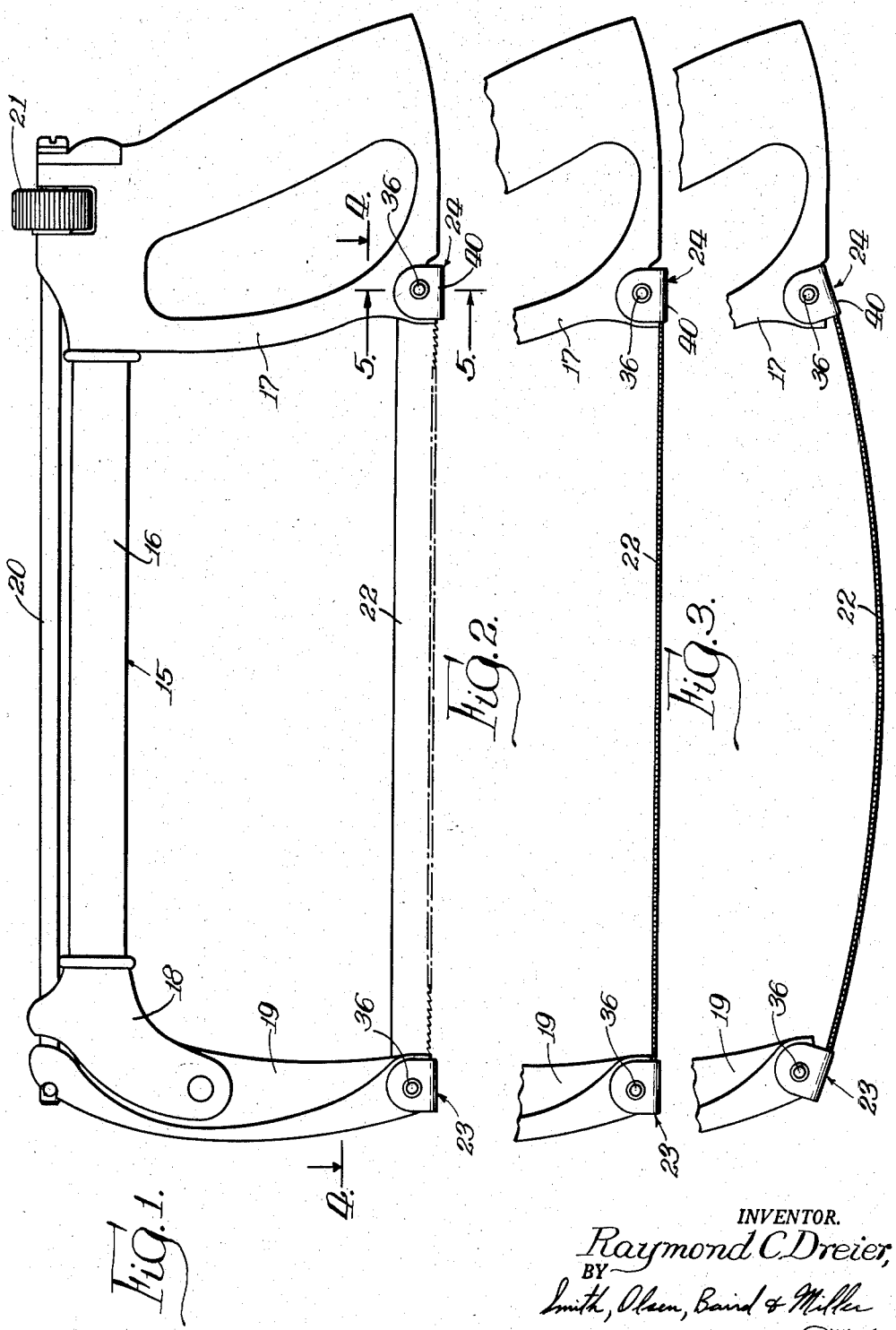

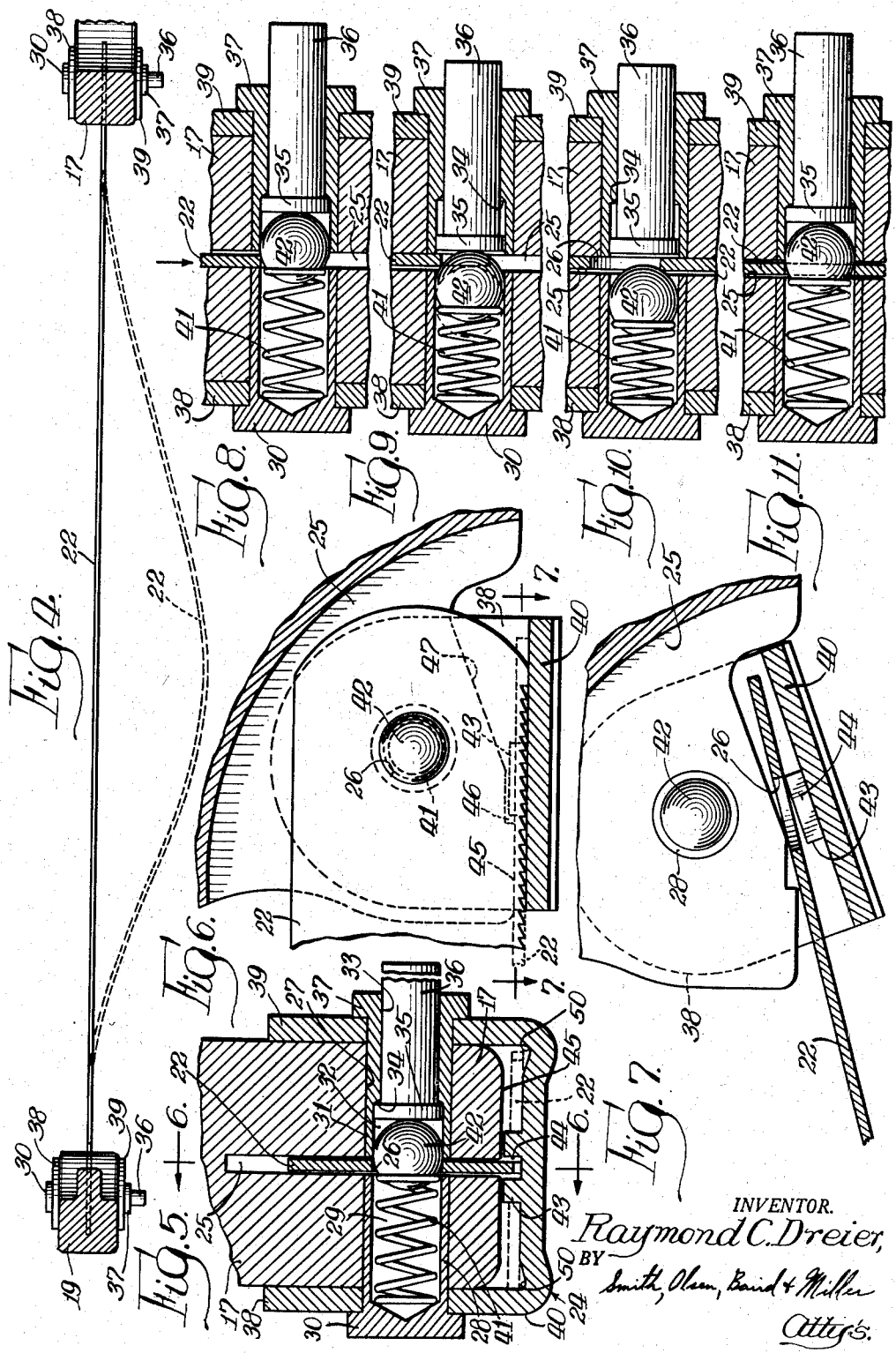

2,869,600

SAW STRUCTURE AND BLADE MOUNT THEREFOR

Raymond C. Dreier, Chicago, Ill., assignor to Dreier Brothers, Inc., Chicago, Ill., a corporation of Illinois Application December 31, 1956, Serial No. 631,538

16 Claims. (Cl. 145—33)

This invention relates to saw structures characterized by the removability of the blades thereof, and exemplified by the hack saw. More particularly, the invention is concerned with a locking or fastening device for releasably securing a saw blade in the frame of a hack saw or corresponding saw structure.

In a conventional hack saw, the frame is provided with spaced apart end portions, each of which carries a pin-equipped fastener that is normally constrained against rotation by means of a square-shaped boss or shoulder that fits within a corresponding square-shaped recess in the end portions of the frame. One of the fastening devices has a threaded end, and a wing nut received thereon enables the fastener to be drawn longitudinally with respect to the frame to tension a hack saw blade secured at each end thereof to the pins of the fasteners—such pins being received within openings provided therefor through the saw blade.

Hack saws are used with the plane of the saw blade oriented either vertically or horizontally; and to permit such adjustment, the fasteners are elongated so that the square-shaped shoulders thereof can be withdrawn from the corresponding openings in the frame ends to permit the fasteners to be rotated through 90°. Thus, when the shoulders are reinserted into the passageways, the fasteners are locked against rotation from their adjusted position; and a saw blade secured thereto will be horizontally disposed if its prior position was vertical, or vice versa.

This type of blade fastening device is presently used and has been used for many years. While it has and does form an acceptable and generally satisfactory fastening means for a hack saw blade, there are a number of disadvantages inherent therein. For example, the pins which are inserted through the openings in the hack saw blade are usually angularly oriented, and this causes a degree of inconvenience in inserting them into the blade openings. Also, changing the positioning of the fasteners is an inconvenience, and frequently one of the fasteners will move through its opening and rotate slightly while the other fastener is being adjusted, thereby necessitating its repositioning. In general, it may be stated that an improved type of fastening device has long been needed in the art, and it is accordingly an object of this invention to provide such improvement.

Another object of this invention is in the provision of a fastening device for securing a removable saw blade in the frame of a saw member, which is simple to use, effective in its locking action, and may be operated to release or secure a saw blade by depressing a finger release. Still another object is that of providing a fastener that is self-locking to automatically secure a saw blade in position in a saw frame when such blade is moved into position within the fastening device. Yet another object is to provide a hack saw frame with a slot in an end thereof for receiving the apertured end portion of a hack saw blade—a locking member being carried by the frame in a normal position of alignment with the slot for receipt within the saw blade aperture, but being movable to a general position of disalignment with the slot to permit insertion and removal of the saw blade from the slot.

A further object of this invention is to provide a fastening arrangement for securing a blade in either a horizontal or vertical position with respect to a hack saw frame, and wherein the horizontal mounting of the blade is effected by pivoting the fasteners outwardly to afford access to pins carried thereby for insertion of those pins through the openings in the hack saw blade, the fasteners being pivoted in the opposite direction when the blade is tensioned to urge the plane of the blade against the hack saw frame and rigidly constrain it thereagainst. Additional objects and advantages will become apparent as the specification develops.

An embodiment of the invention is illustrated in the accompanying drawings, in which—

Figure 1 is a side view in elevation of a hack saw embodying the invention, and with the saw blade thereof oriented in a vertical plane; Figure 2 is a broken side view in elevation similar to that of Figure 1, but showing the saw blade oriented in a horizontal position; Figure 3 is a broken side view in elevation corresponding to that of Figure 2, but showing a saw blade flexed laterally and the fastening devices pivoted outwardly for either mounting or removal of the horizontally disposed blade; Figure 4 is a longitudinal sectional view taken along the line 4—4 of Figure 1, and in which a laterally flexed saw blade (which is the position thereof during mounting or removal) is illustrated by broken lines; Figure 5 is an enlarged broken vertical sectional view taken along the line 5—5 of Figure 1, and in which a horizontally mounted saw blade is illustrated by broken lines; Figure 6 is an enlarged broken vertical sectional view taken along the line 6—6 of Figure 5, and in which a horizontally disposed saw blade is also illustrated by broken lines; Figure 7 is an enlarged broken longitudinal sectional view like Fig. 6 but showing one of the blade holding parts pivoted to open position for receiving a horizontally disposed blade as in Fig. 3, the horizontally disposed saw blade being shown in Fig. 7 in solid lines; and Figures 8 through 11, inclusive, are each an enlarged broken longitudinal sectional view taken generally along the longitudinal axis of the vertically oriented blade as shown in Figure 1, and illustrating respectively progressive positions of the vertically arranged blade during the mounting thereof in one of the fastening devices.

An illustrative embodiment of the invention is shown in Figure 1 in the form of a hack saw designated generally with the numeral 15. The hack saw comprises a frame 16 having at the rear thereof a handle 17, and a bifurcated front end 18 providing a pivotal mounting for a lever or arm 19. A tensioning rod 20 slidably extends through the frame portion 18, and is secured to the upper end of the arm 19 by means of a pin that it carries which is seated within a recess provided therefor in the arm.

The rod 20 also extends through a passage therefor in the upper end of the handle 17, and a knurled adjusting nut 21 constrained against movement along the longitudinal axis of the rod threadedly receives the same, and upon rotation in one direction causes the arm 19 to move in a clockwise direction at the lower end thereof to tension the saw blade 22. Rotation of the nut 21 in the opposite direction will swing the lower end of the arm 19 in a counter-clockwise direction to release tension on the blade 22.

The blade 22 is removably mounted on the frame 16 by means of locking or fastening devices that are designated, respectively and in general, with the numerals 23 and 24. As is shown in Figures 1 and 2, the fastening devices permit the blade 22 to be mounted in either a vertical or horizontal plane, and as is apparent from Figure 3, the fastening devices 23 and 24 (or, more specifically, components thereof as will be more evident from a subsequent description thereof in detail) are rotatable outwardly to enable a horizontally disposed blade to be secured to the frame or released therefrom. It will be apparent that the arm 19 at its lower end must be rotated in a counter-clockwise direction to release tension on the blade 22 before the fastening devices can be pivoted outwardly and into the positions shown in Figure 3.

The fastening devices 23 and 24 are substantially identical, and for that reason only one will be described in detail—such description being equally applicable to the other. As has been indicated, each fastener has a dual function; namely, that of affording either a vertical or horizontal mounting of the saw blade 22. The arrangement which provides the vertical mounting for the blade will first be described, and for such description particular reference will be made to Figure 5.

The frame end portion adjacent each of the fasteners is provided with a slot 25, and in Figure 5 this frame portion is the lower end of the handle 17. This slot is vertically disposed and is adapted to receive the apertured end portion of the saw blade 22 therein. For identification, the aperture or opening which extends transversely through the saw blade is designated with the numeral 26. Extending transversely through the frame end for intersection with the slot 25 is a passage 27, that has pressed thereinto through one end a hollow rivet or sleeve 28 having a bore 29 therein.

The sleeve 28 at its inner end terminates adjacent the slot 25, and at its outer end is provided with a flanged closure 30 spaced from the frame. The opposite end of the passage 27 has mounted therein a sleeve 31 provided with an enlarged bore or passage portion 32 corresponding in cross sectional dimension to that of the bore 29. The sleeve also has a restricted passageway 33 therethrough that merges with the enlarged passage portion 32 through a shoulder 34 that serves as an abutment or seat adapted to engage (as shown in Figure 5) the flange or stop 35 of a plunger 36 that is longitudinally slidable through the passageway 33, but has an end portion that extends outwardly therefrom. The sleeve 31 at its inner end terminates adjacent the slot 25, and at its outer end is equipped with a laterally extending flange 37 spaced from the frame.

The sleeves 28 and 31, respectively, extend through openings provided therefor in the legs 38 and 39 of a generally U-shaped bracket 40. The bracket 40 is supported by the sleeves for pivotal movement about the coincident longitudinal axes thereof. The sleeves are secured within the frame by a press fit so as to be rigidly held therein. The legs of the U-shaped bracket are constrained against longitudinal movement with respect to the sleeves by substantial abutment with the walls of the frame and by the respective flanges 30 and 37.

Mounted within the passage 29 of the sleeve 28 is a helical spring 41 that seats at one end against the flanged closure 30, and at its other end against a locking member 42 that is preferably in the form of a sphere or ball. The spring urges the locking member 42 toward the right, as viewed in Figure 5, and its movement in that longitudinal direction is limited by the plunger 36, and more specifically by the stop flange 35 thereof which seats against the shoulder 34. Thus, the ball or locking member is normally in general alignment with the slot 25, whereby it is received within the opening 26 in the blade 22. However, the center of the locking ball is disposed toward the right of the slot 25 and saw blade mounted therein, and toward the stop 35 and plunger 36.

The bottom wall of each bracket 40 is spaced beneath the lower edge of the frame, as shown in Figure 6, and centrally it is equipped with an upstanding boss or pin 43 dimensioned so as to receive the opening 26 in the blade 22 when the blade is to be mounted in the horizontal position. The pin 43 has extending therethrough a channel 44 adapted to receive the tooth-equipped edge of a vertically mounted blade 22. The bottom or lower edge 45 of the frame between the legs 38 and 39 of each of the brackets 40 has a recess 46 formed therein in alignment with the pin 43 and extending completely across the frame, as is evident from Figure 6. Each recess 46 is enlarged or increases in depth toward the outer edge of the frame, and such enlargement in the case of the frame adjacent the fastener 24 is defined by the outwardly and upwardly inclined edge portion 47 of the frame.

The inclined edge 47 curves downwardly a spaced distance from the edge of the adjacent bracket 40 (Figures 1, 2 and 6) so that the bracket of the fastener 24 may be pivoted into the position shown in Figure 3. At such time, the pin 43 will be in facing relation with the inclined edge 47, but will be spaced therefrom (as shown in Figure 7) so that the apertured end of the saw blade 22 can easily be inserted therebetween and the pin positioned within the aperture of the blade. At the front end of the frame, the arm or lever 19 is rounded slightly along its outer lower edge (Figures 1 through 3) so that the pivotal bracket 40 of the fastener 23 can be moved to the clockwise position thereof shown in Figure 3 to permit a similar insertion of the opposite end of the saw blade and receipt of the pin in the apertures thereof.

The hack saw structure described is easy to use. In mounting a blade 22 in the vertical position, the nut 21 is rotated to swing the lower end of the arm 19 sufficiently close to the handle so that the apertured ends of the blade will seat within the respective fasteners 23 and 24, with the locking spheres 42 in position within the apertures thereof. A mounting sequence directed specifically to the insertion of the blade ends into the fasteners is illustrated in Figures 8 through 11.

In the first of these figures, the blade is being inserted into the slot 25, and its end abuts the locking sphere 42. The plunger 36 is then depressed against the biasing force of the spring 41 to move the center of the sphere to the left of the plane of the blade. Additional force exerted on the blade to move it farther into the recess 25 will cause the sphere to move an additional amount toward the left so as to permit the blade to move therepast, as shown in Figure 10. When the aperture 26 in the blade is aligned with the sphere, the biasing force of the spring thereon will urge it through that aperture and into the position shown in Figure 11, wherein the center of the sphere is disposed to the right of the plane of the blade. This sequence is repeated for insertion of each end of the blade into the respective fasteners.

The nut 21 may now be turned in a direction so as to pivot the lower end of the arm 19 in a clockwise direction to increase the tension of the blade 22. Such tensioning of the blade cannot withdraw it from the interlock with the sphere 42, for if reference is made to Figure 11, it will be apparent that any force exerted along the plane of the saw blade will tend to move the sphere toward the right because its center is offset to the right of the plane of the blade. However, the sphere cannot move toward the right for it is rigidly constrained by the flange 35 of the plunger, which at such time is bearing against the seat or stop 34 of the sleeve 31. Thus, in effect, the greater the tension placed on the blade, the more secure is its anchorage within the fasteners.

The reverse procedure is followed in removing the blade from the fasteners—the plunger 36 first being depressed to offset the center of the sphere to the left or toward the spring side of the blade, whereby the blade can be withdrawn readily from the slot 25. Depending upon the amount of tension in the blade 22, it may or may not be necessary to first release the tension before the plunger 36 can be depressed to move the sphere through the aperture of the blade.

If the saw blade is to be mounted in the horizontal position illustrated in Figures 2 and 3, the nut 21 is again first rotated to move the arm 19 inwardly at its lower end. The brackets 40 of the fasteners 23 and 24 in turn are pivoted or swung outwardly to enable the blade to be inserted thereinto, and the pin 43 of each fastener positioned in the openings of the saw blade. When this has been accomplished, the configuration shown in Figure 3 will be assumed—the blade being bowed laterally. The nut 21 is then turned in the opposite direction to tension the saw blade and position it as shown in Figure 2.

When the blade is tensioned in this horizontal position, the respective fasteners are pivoted inwardly to their normal position, and at this time the blade is rigidly constrained at each end within the fasteners because of its interlock with the pins 43, and also because the plane of the blade adjacent each end thereof is clamped between the lower leg of each bracket 40 and the lower edge 45 of the saw frame. This also results in a true horizontal alignment of the blade from end to end thereof, whereby lateral stresses thereon are obviated. Removal of the blade from the horizontal position is accomplished by reversing the steps; the nut 21 first being turned to swing the arm 19 inwardly whereby the brackets are pivoted outwardly to afford clearance for removal of the blade ends therefrom.

The plane of the saw blade when in horizontal position is tightly gripped between the lower leg or bottom wall of the bracket and lower edge of the frame, because that portion of the pin 43 which extends above the plane of the blade is received within the recess in the lower edge of the frame; and thus does not limit movement of the bottom wall of the bracket against the blade. The channel 44 through the pin is provided to permit movement of the saw blade end into the fastener when the blade is in vertical position, and since it receives the tooth-equipped edge of the vertically disposed blade therein, it tends to stabilize the blade by limiting any tendency toward lateral displacement thereof when the saw is in use.

In connection with each of the brackets 40 for the horizontal mounting of the blades, it will be noted that the vertical axis of each of the upstanding pins 43 thereof is offset slightly from the horizontal axis about which the bracket pivots. As will be evident from Figures 6 and 7, this offset provides for greater clearance between the pin and the adjacent surface 47 than would otherwise be the case when the bracket is moved to its pivoted position, and this permits easier insertion or removal of the blade from the horizontal position. This offset also results in a slight increase of the moment and pinching force exerted between the bracket and the surface 45 of the saw frame when the blade is tightened by operation of the nut 21. The offset requires a little more take-up by the nut 21 when the blade is in the horizontal position than when in the vertical position in order to produce equal blade tensions, but this additional take-up requirement is hardly noticeable in actual use.

It will also be noted with respect to the brackets 40 that the junctions between the legs 38 and 39 thereof with the bottom wall are shaped to provide recesses 50, as illustrated in Figure 5. These recesses provide clearance for the lateral set of teeth of the saw blade when the blade is mounted in the horizontal position.

While in the foregoing specification an embodiment of the invention has been described in considerable detail for purposes of making an adequate disclosure thereof, it will be apparent to those skilled in the art that numerous changes may be made in those details without departing from the spirit and principles of the invention.

I claim:

1. In a saw structure, a saw frame adapted to provide a mounting for a saw blade having a transversely extending opening therethrough adjacent an end thereof, said frame having a slot therein for receiving such end of a saw blade and having also a passage extending transversely through said slot for alignment with the opening in such saw blade, a locking member within said passage and being normally in general alignment with said slot for receipt within the opening in such saw blade, yieldable means within said passage for urging said locking member in one longitudinal direction therein and into the normal position of general alignment with said slot, and means within said passage for moving said locking member in the opposite longitudinal direction against the force of said yieldable means to afford movement of a saw blade into and out of said slot.

2. In a structure, a frame having a slot therein and having also a passage intersecting said slot, a locking member in said passage and being movable along the longitudinal axis thereof, means for limiting movement of said locking member in one longitudinal direction at a position of general alignment with said slot but with the center thereof offset from the slot toward the limiting means, yieldable means for biasing said locking member toward said position, and means for moving said locking member against the biasing force of said yieldable means to offset the center of the locking member from the slot in the opposite direction for affording entry and exit of a member into and from the slot respectively.

3. The structure of claim 2 in which said yieldable means comprises a spring, and in which said locking member is a generally spherical ball.

4. The structure of claim 2 in which said last mentioned means comprises a plunger movable longitudinally within said passage.

5. In a saw structure having a frame equipped with spaced end portions each providing a slot therein adapted to receive the apertured end of a saw blade, means for increasing the spacing between said end portions to tension a saw blade having its ends constrained within said slots, each of said end portions having a passage therein intersecting the respective slots along lines generally transverse thereto, a locking member within each of said passages and being movable along the respective longitudinal axes thereof, spring means in each of said passages biasing the locking members thereof in one longitudinal direction, plunger means in each of said passages and projecting outwardly therefrom for moving the locking members against the biasing force of the respective spring means, and stop means within each of said passages for limiting movement of the locking members thereof under the biasing force of the respective spring means at positions of substantial alignment with the respective slots.

6. The structure of claim 5 in which each of said locking members is generally spherical, and in which said stop means limit movement of the respective locking members at a position wherein the centers of the locking members are offset toward the stop means from the center lines of the respective slots.

7. In a hack saw frame having a pair of spaced end portions adapted to have the respective ends of a saw blade secured thereto, one of the end portions being movable toward and away from the other to tension and release a saw blade secured thereto, at least one of said end portions being provided with a slot therein adapted to removably receive the apertured end of a saw blade therein, that end portion also being provided with a transversely extending passage intersecting said slot at generally right angles with respect thereto, an elongated plunger movable longitudinally with respect to said passage and being equipped at its inner end with a laterally extending flange, a shoulder within said passage for abutment with said flange to limit movement of the plunger in one longitudinal direction, a spring within said passage, and a generally spherical locking member interposed between said spring and said laterally extending flange of the plunger, said shoulder being positioned within said passage for locating said locking member in general alignment with said slot but with the center of the locking member offset therefrom toward the shoulder, said plunger having an end portion extending outwardly from said passage to permit the plunger to be depressed to offset the locking member from said slot in the opposite direction against the biasing force of said spring.

8. In a saw structure, a frame having spaced end portions adapted to provide a mounting for the respective apertured ends of a saw blade, a bracket carried by one of said frame end portions for pivotal movement about an axis extending transversely thereof, said bracket having a bottom wall spaced beneath the lower edge of that frame end portion, a pin extending from said bottom wall into facing adjacent relation with the lower edge of the frame end portion for receipt within the apertured end of a saw blade, said lower edge portion being provided with an enlarged recess at one end thereof defining an open space about said pin when the bracket is pivoted to move the pin thereinto, thereby affording clearance for movement of a saw blade end along the bottom wall of the bracket to position the aperture thereof about said pin.

9. In a saw structure adapted to provide a removable mounting for a saw blade having an aperture in an end portion thereof, a frame member having a lower edge provided with a recess therein enlarged in size toward one of its ends, a bracket provided with a bottom wall spaced from the lower edge of said frame member and being mounted on said frame member for pivotal movement such that said bottom wall subscribes an arc generally along the lower edge of the frame member, and a pin carried by said bottom wall for alignment with said recess and extension thereinto, the enlarged portion of said recess defining, when the bracket is pivoted to bring said pin thereinto, an open space about the pin and a spaced relation with said bottom wall to permit a saw blade end to be inserted thereinto and the aperture thereof positioned about the pin.

10. In a hack saw structure equipped with a frame member having a lower edge provided with a recess therein and with an upwardly and rearwardly inclined edge surface communicating at its inner end with the recess, a generally U-shaped bracket pivotally carried by said frame member and having a bottom wall spaced beneath said lower edge, said bracket being pivotal between a position wherein said bottom wall is in facing relation with said lower edge forwardly of said recess and a position rearwardly of the recess in facing relation with said upwardly and rearwardly inclined surface, and a pin secured to said bottom wall and extending upwardly therefrom and being dimensioned and arranged so that the upper end portion thereof is received within said recess when the bottom wall of the bracket is in facing relation with said lower edge portion forwardly of the recess but being spaced substantially from said upwardly and rearwardly inclined surface when the bottom wall of the bracket is in facing relation therewith to permit the apertured end of a hack saw blade to be inserted into the bracket and the pin positioned within the aperture of the blade, the bottom wall of said bracket being spaced from the lower edge of said frame member for clamping a hack saw blade therebetween when the bottom wall of the bracket is in facing relation with the lower edge of said frame forwardly of said recess.

11. In a saw structure, a frame having spaced end portions adapted to provide a mounting for the respective aperture-equipped ends of a saw blade, means for selectively increasing and decreasing the spacing between the frame ends to tension and release respectively a saw blade mounted in the frame, a bracket supported by one of said frame ends for movement inwardly and outwardly along the longitudinal axis of a saw blade mounted in said frame, said bracket having a bottom wall disposed beneath the lower edge of that frame end and spaced therefrom for receiving and clamping a saw blade end therebetween when such saw blade is tensioned, and a pin carried by said bottom wall and extending upwardly therefrom toward said lower edge, said lower edge being recessed throughout the outer end portion thereof to define a spaced relation with said bottom wall and pin sufficient to permit the mounting of the apertured end of a saw blade therein with the pin positioned in such aperture.

12. In a hack saw structure, a frame having a slot therein and having also a passage intersecting said slot, a locking member in said passage and being movable along the longitudinal axis thereof, means for limiting movement of said locking member in one longitudinal direction at a position of general alignment with said slot but with the center thereof offset from the slot toward the limiting means, yieldable means for biasing said locking member in said position, means for moving said locking member against the force of said yieldable means to offset the center of the locking member from the slot in the opposite direction, a bracket supported by said frame for pivotal movement about an axis extending generally along the longitudinal axis of said passage and being equipped with a bottom wall spaced beneath the lower edge of said frame, a pin carried by said bottom wall and extending upwardly therefrom in alignment with said slot, said pin having a channel extending therethrough along said slot and said slot being open along said lower edge of the frame, said lower edge being provided with an enlarged recess therein toward the outer end thereof to permit said bracket to be pivoted outwardly, said enlarged recess defining a space about said pin when said bracket is pivoted outwardly for receiving a hack saw blade therein to permit insertion of the pin through the apertured end of the blade.

13. In a hack saw frame having a pair of spaced end portions adapted to have the respective apertured ends of a saw blade secured thereto, one of the end portions being movable toward and away from the other to tension and release a saw blade mounted in the frame, one of said ends being provided with a slot therein open along its lower edge thereof, said one end having a passage therein extending transversely of said slot and intersecting the same, a generally U-shaped bracket having a bottom wall disposed beneath and in spaced relation with the lower edge of said one end and being equipped with a pin extending upwardly therefrom provided with a channel therethrough in alignment with said slot, means for supporting said bracket for pivotal movement about the longitudinal axis of said passage, said lower edge being provided with a recess therein intermediate its ends and enlarging toward its outer end to define a spaced dimensional relation with said pin when the bracket is pivoted outwardly such that the apertured end of a saw blade can be mounted about the pin, a generally spherical locking member positioned in said passage for movement along the longitudinal axis thereof, spring means in said passage biasing said locking member in one longitudinal direction, a plunger movable along the longitudinal axis of said passage and having portions for moving said locking member against the biasing force of said spring means, and a stop within said passage for limiting movement of said locking member under the biasing force of said spring means at a position wherein the locking member is disposed within said slot but with its center disposed laterally thereof toward said stop.

14. The structure of claim 13 in which said plunger is equipped with a flange engageable with said stop for limiting movement of said locking member.

15. The structure of claim 13 in which said pin is received within said recess when said bracket is pivoted inwardly, and in which said lower edge of the frame and the bottom wall of said bracket are dimensionally related for gripping a saw blade disposed therebetween when the bracket is pivoted inwardly.

16. The structure of claim 13 in which said means for supporting said bracket for pivotal movement comprises a pair of flange-equipped sleeves each having a passage therein, said bracket being pivotally carried by the respective sleeves inwardly of the flanges thereof, and each sleeve being mounted in said passage in the frame through opposite ends thereof.

References Cited in the file of this patent

UNITED STATES PATENTS

| | | |
|---|---|---|
| 267,060 | Buell | Nov. 7, 1892 |
| 1,259,603 | Conord | Mar. 19, 1918 |

FOREIGN PATENTS

| | | |
|---|---|---|
| 60,494 | Austria | Aug. 11, 1913 |